United States Patent
Yu et al.

(10) Patent No.: US 9,660,367 B2
(45) Date of Patent: May 23, 2017

(54) SMART CARD SEAT AND ELECTRONIC DEVICE

(71) Applicant: Xiaomi Inc., Beijing (CN)

(72) Inventors: Licheng Yu, Beijing (CN); Fenghui Wu, Beijing (CN); Duo Xu, Beijing (CN); Kesheng Yan, Beijing (CN)

(73) Assignee: XIAOMI INC., Haidian District, Beijing (CN)

( * ) Notice: Subject to any disclaimer, the term of this patent is extended or adjusted under 35 U.S.C. 154(b) by 0 days.

(21) Appl. No.: 14/972,020

(22) Filed: Dec. 16, 2015

(65) Prior Publication Data
US 2016/0268712 A1    Sep. 15, 2016

(30) Foreign Application Priority Data

Mar. 13, 2015 (CN) .......................... 2015 1 0109909

(51) Int. Cl.
| | |
|---|---|
| *H01R 13/60* | (2006.01) |
| *H01R 12/70* | (2011.01) |
| *G06K 7/00* | (2006.01) |
| *H01R 4/48* | (2006.01) |
| *H01R 13/73* | (2006.01) |
| *H01R 13/24* | (2006.01) |

(52) U.S. Cl.
CPC ....... *H01R 12/7076* (2013.01); *G06K 7/0013* (2013.01); *H01R 4/48* (2013.01); *H01R 13/73* (2013.01); *H01R 13/2442* (2013.01)

(58) Field of Classification Search
CPC .................................. H01R 12/7076
USPC ................................ 439/529, 630
See application file for complete search history.

(56) References Cited

U.S. PATENT DOCUMENTS

| | | | |
|---|---|---|---|
| 6,616,485 B2 * | 9/2003 | Harasawa .......... | H01R 13/2442 439/630 |
| 7,357,678 B1 | 4/2008 | Lee et al. | |
| 2006/0089052 A1 * | 4/2006 | Lu ...................... | H01R 13/7035 439/630 |
| 2009/0023318 A1 * | 1/2009 | Nishioka .............. | G06K 7/0034 439/159 |

(Continued)

FOREIGN PATENT DOCUMENTS

| | | |
|---|---|---|
| CN | 204012079 U | 12/2014 |
| CN | 104283056 A | 1/2015 |

(Continued)

OTHER PUBLICATIONS

International Search Report for PCT/CN2015/093298.
Extended European search report of 16152722.1.

*Primary Examiner* — Tulsidas C Patel
*Assistant Examiner* — Peter G Leigh
(74) *Attorney, Agent, or Firm* — Jun He Law Offices P.C.; James J. Zhu

(57) ABSTRACT

A smart card seat and an electronic device are provided. The smart card seat includes a seat body and at least one seat terminal for electrically contacting a metal contact of a smart card. Each of the at least one seat terminal comprises a terminal fixing portion and a strip-shaped terminal cantilever. Moreover the terminal cantilever has a tail fixedly connected to a first stationary end of the terminal fixing portion, a head operatively placed on a second stationary end of the terminal fixing portion, and a middle portion higher than the tail and the head.

4 Claims, 3 Drawing Sheets

(56) References Cited

U.S. PATENT DOCUMENTS

| | | | |
|---|---|---|---|
| 2010/0015824 A1* | 1/2010 | Wang | H01R 13/2464 |
| | | | 439/108 |
| 2010/0081297 A1 | 4/2010 | Miller | |
| 2015/0004850 A1* | 1/2015 | Tsuji | G06K 7/0013 |
| | | | 439/733.1 |

FOREIGN PATENT DOCUMENTS

| | | |
|---|---|---|
| CN | 104319520 A | 1/2015 |
| CN | 204103141 U | 1/2015 |
| CN | 204179267 U | 2/2015 |
| CN | 204190022 U | 3/2015 |
| CN | 204333364 U | 5/2015 |
| CN | 204615021 U | 9/2015 |
| DE | 10064137 A1 | 7/2002 |
| EP | 0981103 A1 | 2/2000 |
| JP | 2009129890 A | 6/2009 |
| JP | 4733610 B2 | 7/2011 |
| KR | 20040104892 A | 12/2004 |
| RU | 2181908 C2 | 4/2002 |

* cited by examiner

SMART CARD SEAT AND ELECTRONIC DEVICE

CROSS-REFERENCE TO RELATED APPLICATIONS

This application is based upon and claims priority to Chinese Patent Application No. 201510109909.5, filed on Mar. 13, 2015, which is incorporated herein by reference in its entirety.

TECHNICAL FIELD

The present disclosure relates to the mechanical field, and more particularly, to a smart card seat and an electronic device.

BACKGROUND

A smart card seat is an essential component for an electronic device such as a cellphone to receive a smart card of the electronic device. The smart card seat has various forms with the development of the electronic industry.

Generally, the smart card seat usually has a seat terminal which is secured onto a seat body. The seat terminal typically includes a terminal fixing portion and a terminal cantilever. A tail of the terminal cantilever is connected to the terminal fixing portion and a head of the terminal cantilever is in a free state, such that a metal contact of a smart card may be electrically connected to the terminal cantilever after the smart card is inserted into the card seat. The terminal cantilever may rebound after the smart card is removed.

SUMMARY

The present disclosure provides a smart card seat and an electronic device. The technical solutions are hereby given as follows.

According to a first aspect of embodiments of the present disclosure, there is provided a smart card seat including a seat body and at least one seat terminal for electrically contacting a metal contact of a smart card. Each of the at least one seat terminal includes a terminal fixing portion and a strip-shaped terminal cantilever. The terminal cantilever has a tail fixedly connected to a first stationary end of the terminal fixing portion, a head operatively placed on a second stationary end of the terminal fixing portion, and a middle portion higher than the tail and the head.

According to a second aspect of embodiments of the present disclosure, there is provided an electronic device including the smart card seat according to the first aspect of embodiments of the present disclosure.

The technical solutions provided by embodiments of the present disclosure may have the following advantages.

The head of the terminal cantilever can be in contact with the second stationary end of the terminal fixing portion by fixedly connecting the tail of the terminal cantilever to the first stationary end of the terminal fixing portion. As the head of the terminal cantilever is stably placed on the terminal fixing portion, the present disclosure solves a problem that the head of the terminal cantilever in the free state fails to rebound because of excessive pressure after the smart card is removed from the smart card seat, which leads to difficulty in electrically connecting the circuits between the smart card seat and the smart card when the smart card is re-inserted into the seat. Thus, the stability of connection between the smart card seat and the smart card can be improved.

It is to be appreciated that both the foregoing general description and the following detailed description are exemplary and explanatory only and are not restrictive of the invention.

BRIEF DESCRIPTION OF THE DRAWINGS

The accompanying drawings, which are incorporated in and constitute a part of this specification, illustrate embodiments consistent with the invention and, together with the description, serve to explain the principles of the invention.

DETAILED DESCRIPTION

Reference will now be made in detail to exemplary embodiments, examples of which are illustrated in the accompanying drawings. The following description refers to the accompanying drawings in which the same numbers in different drawings represent the same or similar elements unless otherwise represented. The implementations set forth in the following description of exemplary embodiments do not represent all implementations consistent with the invention. Instead, they are merely examples of devices and methods consistent with some aspects related to the invention as recited in the appended claims.

Figure 1:
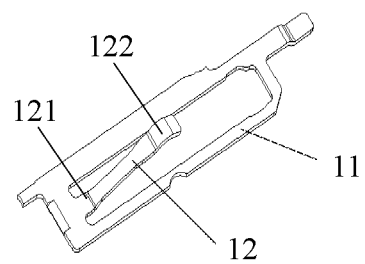
FIG. 1 is a structural schematic diagram of a seat terminal according to an exemplary embodiment.

FIG. 1 is a structural schematic diagram of a seat terminal according to an exemplary embodiment. As shown in FIG. 1, a seat terminal includes a terminal fixing portion 11 and a terminal cantilever 12 with its tail 121 connected to the terminal fixing portion 11 and its head 122 in a free state. The head 122 of the terminal cantilever 12 is mainly used to electrically contacting a metal contact of a smart card. The terminal cantilever 12 is pressed by the smart card when the smart card is inserted into the smart card seat, such that the head 122 of the terminal cantilever 12 is in electrical contact with the metal contact of the smart card and moves downwards due to the applied pressing force, such that a connection structure between the tail 121 of the terminal cantilever 12 and the terminal seat 11 is also deformed under the pressing force. The pressing force applied to the terminal cantilever 12 by the smart card is removed, when the smart card is removed from the smart card seat. Therefore, in a normal condition, the head 122 of the terminal cantilever 12 may rebound to its original position, and the connection structure between the tail 121 of the terminal cantilever 12 and the terminal seat 11 also returns to its original shape.

In practice use, since the connection structure between the tail 121 of the terminal cantilever 12 and the terminal seat 11 can only withstand a limited force, the connection between the tail 121 of the terminal cantilever 12 and the terminal seat 11 may not return to its original shape after deformation, if the terminal cantilever 12 is applied with a long-term pressing force by the smart card or applied with a pressing force beyond a maximum allowable value. Accordingly, the head 122 of the terminal cantilever 12 may not rebound to its original position. As a result, when the smart card is inserted into the smart card seat, the head 122 of the terminal cantilever 12 may fail to electrically contact the metal contact of the smart card because the head 122 of the terminal cantilever 12 fails to rebound to its original position. Then the smart card can not be read by the electronic device having the smart card seat.

Figure 2A:
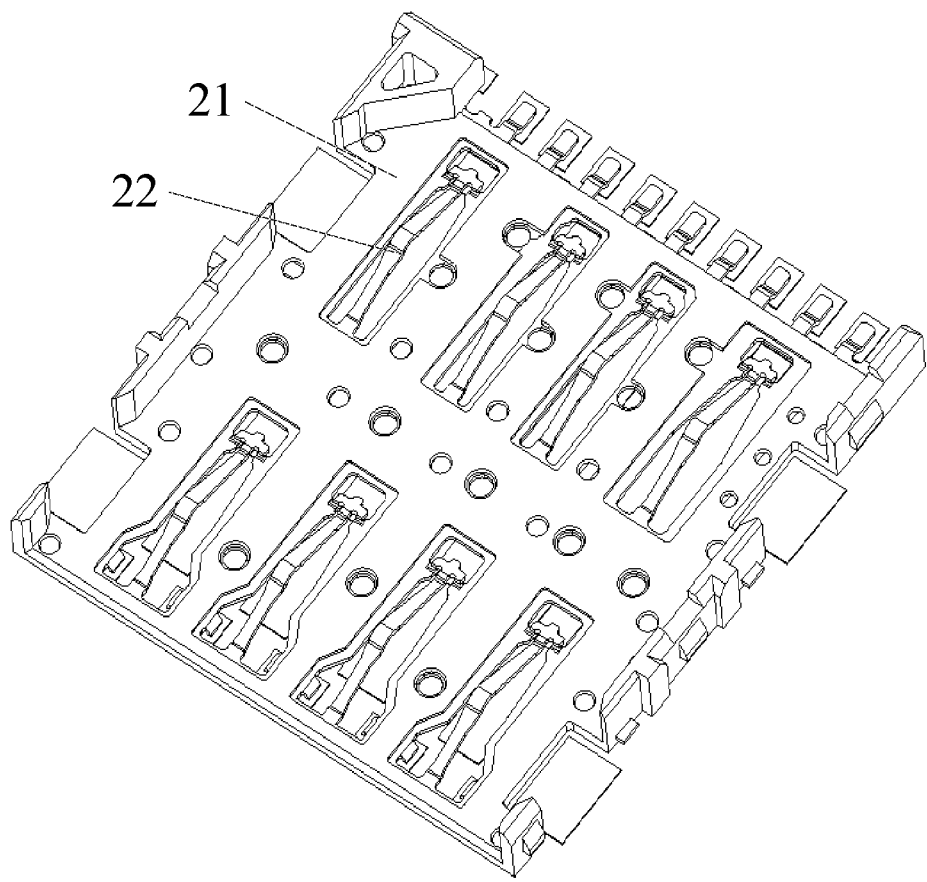
FIG. 2A is a structural schematic diagram of a smart card seat according to an exemplary embodiment.

Therefore, in order to prevent the above situation, there is a need for an improved smart card seat. With reference to FIG. 2A, it is a structural schematic diagram of a smart card seat according to an exemplary embodiment. As shown in FIG. 2A, the smart card seat includes a seat body 21 and at least one seat terminal 22 for electrically contacting a metal contact of a smart card.

Figure 2B:
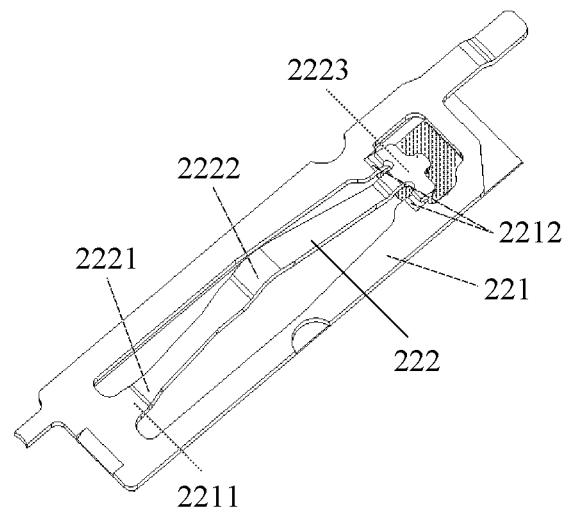
FIG. 2B is a structural schematic diagram of a seat terminal of a smart card seat according to an exemplary embodiment.

With respect to each seat terminal 22, FIG. 2B shows a structural schematic diagram of a seat terminal of a smart card seat according to an exemplary embodiment. As shown in FIG. 2B, each seat terminal 22 includes a terminal fixing portion 221 and a strip-shaped terminal cantilever 222. A tail 2221 of the terminal cantilever 222 is fixedly connected to a first stationary end 2211 of the terminal fixing portion 221, a head 2223 of the terminal cantilever 222 is operatively placed on a second stationary end 2212 of the terminal fixing portion 221, and a middle portion 2222 of the terminal cantilever 222 is higher than the tail 2221 of the terminal cantilever 222 and the head 2223 of the terminal cantilever 222. The middle portion 2222 is located between the tail 2221 and the head 2223.

The middle portion 2222 of the terminal cantilever 222 is mainly used to electrically contact a metal contact of the smart card directly, therefore the middle portion 2222 of the terminal cantilever 222 is higher than the tail 2221 of the terminal cantilever 222 and the head 2223 of the terminal cantilever 222. In other words, the middle portion 2222 of the terminal cantilever 222 forms an elevated structure, which may be formed by bending the terminal cantilever 222, or formed with a mould. In this embodiment, the manner for forming the middle portion 2222 of the terminal cantilever 222 is not limited.

Alternatively, the terminal fixing portion 221 is a framed metal structure with a cutout in the middle of the framed metal structure, and the terminal cantilever 222 is located above the cutout of the terminal fixing portion 221.

The terminal fixing portion 221 is a framed metal structure with a cutout in the middle. Moreover, the first stationary end 2211 is at a position inside the framed metal structure corresponding to the position of the tail 2221 of the terminal cantilever 222, and the second stationary end 2212 is at another position inside the framed metal structure corresponding to the position of the head 2223 of the terminal cantilever 222.

The terminal cantilever 222 is located above the cutout of the terminal fixing portion 221, which provides an extending space for the terminal cantilever 222. Generally, the terminal cantilever 222, which is moved downwards due to a pressing force applied by the insertion of the smart card, may be received in the cutout.

Alternatively, the second stationary end 2212 has two bending portions protruding relative to the cutout, each of which declines gradually in a direction from the tail 2221 to the head 2223 of the terminal cantilever 222.

Figure 2C:
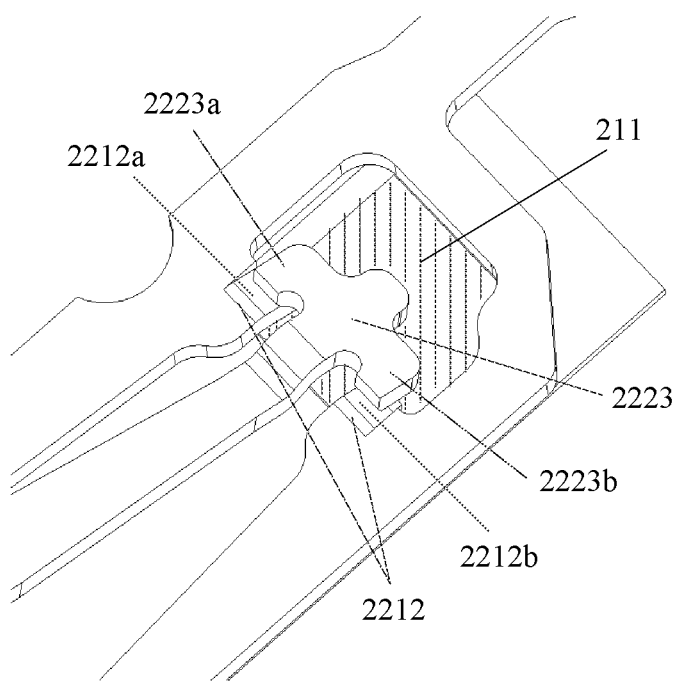
FIG. 2C is a structural schematic diagram of a head of the seat terminal according to an exemplary embodiment.

With reference to FIG. 2C, it is a structural schematic diagram of the head of a seat terminal according to an exemplary embodiment. As shown in FIG. 2C, the second stationary end 2212 has bending portions 2212a and 2212b protruding relative to the cutout, both of which decline gradually in the direction from the tail 2221 to the head 2223 of the terminal cantilever 222.

It should be noted that the bending portions with the arrangement may facilitate the abutment with the head 2223 of the terminal cantilever 222 before the smart card is inserted into the smart card seat, thereby supporting the terminal cantilever 222 better. Accordingly, the terminal cantilever 222 can also keep a stable state before the smart card is inserted into the smart card seat. Moreover, the bending portions with such arrangement may also make the head 2223 of the terminal cantilever 222 slide forwards more smoothly when the smart card is inserted into the smart card seat.

Alternatively, the head 2223 of the terminal cantilever 222 has two supporting portions protruding laterally from the head, and the two supporting portions protrude away from each other.

With reference to FIG. 2C, as shown in FIG. 2C, the head 2223 of the terminal cantilever 222 has supporting portions 2223a and 2223b protruding laterally from the head and away from each other. The supporting portion 2223a is placed on the bending portion 2212a while the supporting portion 2223b is placed on the bending portion 2212b before the smart card is inserted into the smart card seat. When the smart card is inserted into the smart card seat, the supporting portions 2223a and 2223b may slide downwards along the bending portions 2212a and 2212b, respectively.

Alternatively, the seat body 21 has a metal plate below the head 2223 of the terminal cantilever 222.

With reference to FIG. 2C again, as shown in FIG. 2C, the seat body 21 has with a metal plate 211 below the head 2223 of the terminal cantilever 222. The metal plate 211 is mainly used to prevent the damage to the circuit board caused by the sliding of the head 2223 of the terminal cantilever 222 on the circuit board below, as well as preventing particles produced by the sliding of the head from affecting the action of the terminal cantilever 222.

Alternatively, the supporting portions are located on the bending portions and in contact with the bending portions, respectively, when the smart card is not inserted into the smart card seat.

The supporting portions are disengaged from the bending portions and slide forwards to contact the metal plate, when the smart card is inserted into the smart card seat.

Figure 2D:
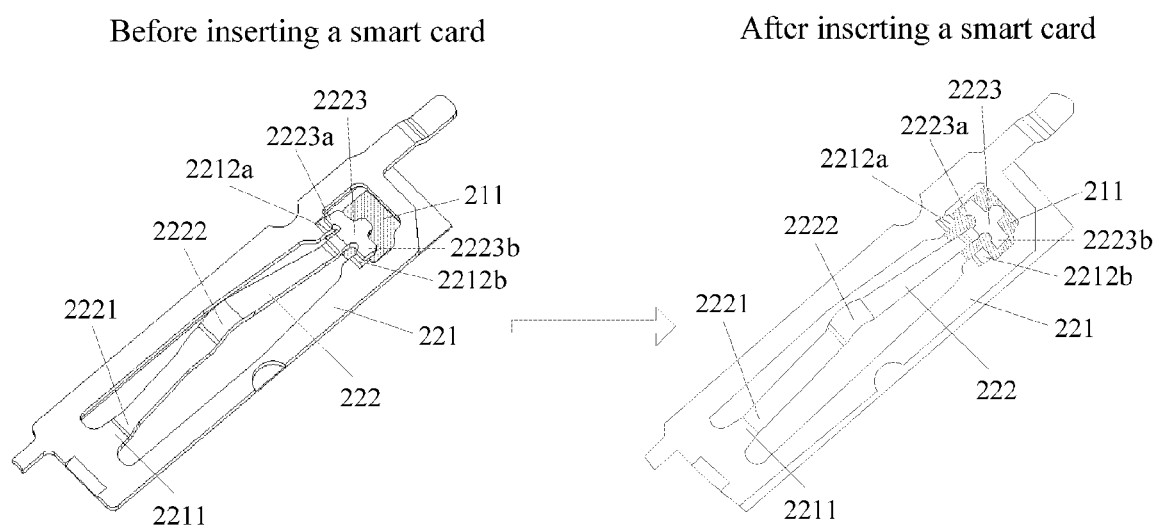
FIG. 2D is a structural schematic diagram of a seat terminal before and after a smart card is inserted into the smart card seat according to an exemplary embodiment.

With reference to FIG. 2D, it is a structural schematic diagram of a seat terminal before and after a smart card is inserted into a smart card seat according to an exemplary embodiment. As shown in FIG. 2D, when no smart card is inserted into the smart card seat, the supporting portion 2223a of the head 2223 of the terminal cantilever 222 is placed on the bending portion 2212a of the terminal fixing portion 221, while the supporting portion 2223b of the head 2223 of the terminal cantilever 222 is placed on the bending portion 2212b of the terminal fixing portion 221. Under such condition, the head 2223 of the terminal cantilever 222 may be or may not be in contact with the metal plate 211 below. When the smart card is inserted into the smart card seat, the middle portion 2222 of the terminal cantilever 222 is in contact with metal contact of the smart card and moves downwards under the pressing force of the smart card. The connection structure between the tail 2221 of the terminal cantilever 222 and the first stationary end 2211 of the terminal fixing portion 221 is deformed due to the applied pressing force; and the supporting portions 2223a and 2223b of the head 2223 of the terminal cantilever 222 slide along the corresponding bending portions 2212a and 2212b of the terminal fixing portion 221 due to the applied pressing force, and is disengage from and gradually moves away from the bending portions 2212a and 2212b. The head 2223 of the terminal cantilever will abut against the metal plate 211 after the smart card is completely inserted into the smart card seat.

It should be noted that when the smart card is inserted into the smart card seat, the pressing force applied by the smart card is directly applied to the middle portion 2222 of the terminal cantilever 222, and the pressing force is then distributed to the tail 2221 of the terminal cantilever 222 and the head 2223 of the terminal cantilever 222, such that both the tail 2221 and the head 2223 of the terminal cantilever 222 can bear the pressing force from the smart card, to increase the maximum value of pressing force that can be withstood by the entire terminal cantilever 222. As such, the phenomenon that the terminal cantilever 222 fails to rebound may not happen.

Alternatively, the metal plate 211 may have an area larger than a sliding area for the sliding of the head 2223 of the terminal cantilever 222.

The metal plate 211 is arranged to prevent the damages to the circuit board caused by the sliding of the head 2223 of the terminal cantilever 222 on the circuit board below, therefore the area of the metal plate 211 should be larger than the sliding area for the sliding of the head 2223 of the terminal cantilever 222.

From the foregoing, as for the smart card seats according to the embodiments, the head of the terminal cantilever can be in contact with the second stationary end of the terminal fixing portion by fixedly connecting the tail of the terminal cantilever to the first stationary end of the terminal fixing portion. As the head of the terminal cantilever is stably placed on the terminal fixing portion, the present disclosure solves a problem that the head of the terminal cantilever in the free state fails to rebound because of excessive pressure after the smart card is removed from the smart card seat, which leads to difficulty in electrically connecting the circuits between the smart card seat and the smart card when the smart card is re-inserted into the seat. Thus, the stability of connection between the smart card seat and the smart card can be improved.

In addition, the seat body has the metal plate below the head of the terminal cantilever. As the head of the terminal cantilever may slide on the metal plate when the smart card is inserted into the smart card seat, the present disclosure solves the problem that the circuit board may be damaged by the sliding of the head of the terminal cantilever on the circuit board. Thus, the embodiment of the present disclosure improves the service life of the smart card seat.

Other embodiments of the invention will be apparent to those skilled in the art from consideration of the specification and practice of the invention disclosed here. This application is intended to cover any variations, uses, or adaptations of the invention following the general principles thereof and including such departures from the present disclosure as come within known or customary practice in the art. It is intended that the specification and examples be considered as exemplary only, with a true scope and spirit of the invention being indicated by the following claims.

It will be appreciated that the present invention is not limited to the exact construction that has been described above and illustrated in the accompanying drawings, and that various modifications and changes can be made without departing from the scope thereof. It is intended that the scope of the invention should only be limited by the appended claims.

What is claimed is:

1. A smart card seat comprising a seat body and at least one seat terminal for electrically contacting a metal contact of a smart card,
    wherein each of the at least one seat terminal comprises a terminal fixing portion and a strip-shaped terminal cantilever; and the terminal cantilever has a tail fixedly connected to a first stationary end of the terminal fixing portion, a head operatively placed on a second stationary end of the terminal fixing portion, and a middle portion higher than the tail and the head;
    wherein the terminal fixing portion is a framed metal structure with a cutout in the middle, and the terminal cantilever is located above the cutout of the terminal fixing portion;
    wherein the second stationary end has two bending portions protruding relative to the cutout, and each bending portion gradually declines in a direction from the tail to the head of the terminal cantilever;
    wherein the head of the terminal cantilever has two supporting portions protruding laterally from the head and away from each other;
    wherein the seat body comprises a metal plate below the head of the terminal cantilever; and
    wherein the supporting portions are in contact with the bending portions, respectively, when the smart card is not inserted into the smart card seat, and the supporting portions are disengaged from the bending portions and slide forwards to contact the metal plate, when the smart card is inserted into the smart card seat.

2. The smart card seat according to claim 1, wherein the metal plate has an area larger than a sliding area for the sliding of the head of the terminal cantilever.

3. An electronic device, wherein the electronic device comprises a smart card seat comprising a seat body and at least one seat terminal for electrically contacting a metal contact of a smart card,
    wherein each of the at least one seat terminal comprises a terminal fixing portion and a strip-shaped terminal cantilever; and the terminal cantilever has a tail fixedly connected to a first stationary end of the terminal fixing portion, a head operatively placed on a second stationary end of the terminal fixing portion, and a middle portion higher than the tail and the head;
    wherein the terminal fixing portion is a framed metal structure with a cutout in the middle, and the terminal cantilever is located above the cutout of the terminal fixing portion;
    wherein the second stationary end has two bending portions protruding relative to the cutout, and each bending portion gradually declines in a direction from the tail to the head of the terminal cantilever;
    wherein the head of the terminal cantilever has two supporting portions protruding laterally from the head and away from each other;
    wherein the seat body comprises a metal plate below the head of the terminal cantilever; and
    wherein the supporting portions are in contact with the bending portions, respectively, when the smart card is not inserted into the smart card seat, and the supporting portions are disengaged from the bending portions and slide forwards to contact the metal plate, when the smart card is inserted into the smart card seat.

4. The electronic device according to claim 3, wherein the metal plate has an area larger than a sliding area for the sliding of the head of the terminal cantilever.

* * * * *